(12) United States Patent
Evans (10) Patent No.: US 7,606,678 B2
(45) Date of Patent: Oct. 20, 2009

(54) METHOD FOR MONITORING A FCC CATALYST INJECTION SYSTEM

(75) Inventor: Martin Evans, Tolland, CT (US)

(73) Assignee: Intercat Equipment, Inc., Manasquan, NJ (US)

( * ) Notice: Subject to any disclaimer, the term of this patent is extended or adjusted under 35 U.S.C. 154(b) by 734 days.

(21) Appl. No.: 10/859,032

(22) Filed: Jun. 2, 2004

(65) Prior Publication Data

US 2004/0260487 A1 Dec. 23, 2004

Related U.S. Application Data

(63) Continuation-in-part of application No. 10/304,670, filed on Nov. 26, 2002, now Pat. No. 7,050,944, and a continuation-in-part of application No. 10/320,064, filed on Dec. 16, 2002, now Pat. No. 6,859,759.

(51) Int. Cl.
*G06F 7/04* (2006.01)
(52) U.S. Cl. ............. 702/122; 702/30; 702/182; 702/183; 702/188
(58) Field of Classification Search ......... 702/182–183, 702/188, 30, 122; 422/22; 423/203; 585/240; 208/120.1, 120.05, 152, 151
See application file for complete search history.

(56) References Cited

U.S. PATENT DOCUMENTS

| | | | |
|---|---|---|---|
| 4,054,784 A | | 10/1977 | Ricclardi et al. |
| 4,219,407 A | * | 8/1980 | Haddad et al. ............... 208/151 |
| 4,368,114 A | * | 1/1983 | Chester et al. ......... 208/120.05 |
| 4,371,499 A | * | 2/1983 | Bard et al. ................... 208/113 |
| 4,384,948 A | | 5/1983 | Barger |
| 4,416,765 A | * | 11/1983 | Chester et al. ........... 208/120.1 |
| RE32,101 E | | 4/1986 | Ricclardi et al. |
| 4,810,360 A | * | 3/1989 | Haddad et al. ............... 208/152 |

(Continued)

FOREIGN PATENT DOCUMENTS

EP    0 408 606    9/1993

(Continued)

OTHER PUBLICATIONS

"Corn Starch Batching System," Corn Startch & Liquids Blending System for Atochem—Buffalo, NY (Job #1193D), TOPDOC-AB5 by Tele-Denken Resources, Inc. 2.25. created Jun. 22, 1992. printed Jun. 22, 1992, pp. 42-51. 31-34, 64, and 68.

(Continued)

*Primary Examiner*—Drew A Dunn
*Assistant Examiner*—Hien X Vo
(74) *Attorney, Agent, or Firm*—Tanzina Chowdhury; Patterson & Sheridan, LLP; Keith P. Taboada (57) ABSTRACT

A method for monitoring a FCC catalyst injection system is provided. One embodiment of the invention includes steps for determining an occurrence of a pre-defined event and establishing communication between a control module of the injection system and a remote device in response to the event. In another embodiment of the invention, a method is described which entails the acquisition of data from the injection system by a plurality of sensors. After the data is obtained, it is subsequently stored in the memory device of the control module. Communication is then established between a remote device and the control module to transfer the data.

17 Claims, 10 Drawing Sheets

U.S. PATENT DOCUMENTS

| | | | |
|---|---|---|---|
| 4,927,523 A | | 5/1990 | Donnelly |
| 4,927,526 A | | 5/1990 | Anderson et al. |
| 4,994,173 A | | 2/1991 | Tai-Sheng et al. |
| 5,032,252 A | | 7/1991 | Owen et al. |
| 5,081,600 A | | 1/1992 | Tump |
| 5,215,653 A | * | 6/1993 | Nelson et al. ............... 208/152 |
| 5,260,850 A | | 11/1993 | Sherwood et al. |
| 5,357,306 A | | 10/1994 | Skye et al. |
| 5,372,704 A | | 12/1994 | Harandi et al. |
| 5,389,236 A | * | 2/1995 | Bartholic et al. ............ 208/152 |
| 5,454,918 A | * | 10/1995 | Javadi et al. ............ 205/786.5 |
| 5,785,934 A | | 7/1998 | Jacobs et al. |
| 5,810,045 A | | 9/1998 | Evans |
| 6,013,158 A | | 1/2000 | Wootten |
| 6,358,401 B1 | | 3/2002 | Evans |
| 6,535,795 B1 | | 3/2003 | Schroeder et al. |
| 6,859,759 B2 | | 2/2005 | Evans |
| 6,974,559 B2 | | 12/2005 | Evans |
| 7,050,944 B2 | | 5/2006 | Evans |
| 2003/0089426 A1 | | 5/2003 | Poor et al. |

FOREIGN PATENT DOCUMENTS

| | | |
|---|---|---|
| WO | WO 89/07487 | 8/1989 |
| WO | WO-2005/095549 A2 | 10/2005 |

OTHER PUBLICATIONS

"IMS to Control Room", Dwg S-29, Sheet 1, Intercat, Savannah. Georgia, Nov. 26. 2001.

Everlasting Valve Company, www.everlastingvalveco.com, printed Feb. 8, 2003.

ADPI C-Engine, www.adpi.com/C-Engioratin.htm, printed Nov. 15, 2002.

\* cited by examiner

METHOD FOR MONITORING A FCC CATALYST INJECTION SYSTEM

CROSS-REFERENCE TO RELATED APPLICATION

This application is a continuation-in-part of U.S. patent application Ser. No. 10/304,670, filed Nov. 26, 2002 now U.S. Pat. No. 7,050,944 and U.S. patent application Ser. No. 10/320,064, filed Dec. 16, 2002, now U.S. Pat. No. 6,859,759 which are incorporated herein by reference in their entireties.

BACKGROUND OF THE INVENTION

1. Field of the Invention

Embodiments of the invention generally relate to a method for monitoring a FCC catalyst injection system, and the like.

2. Description of the Related Art

Figure 1:
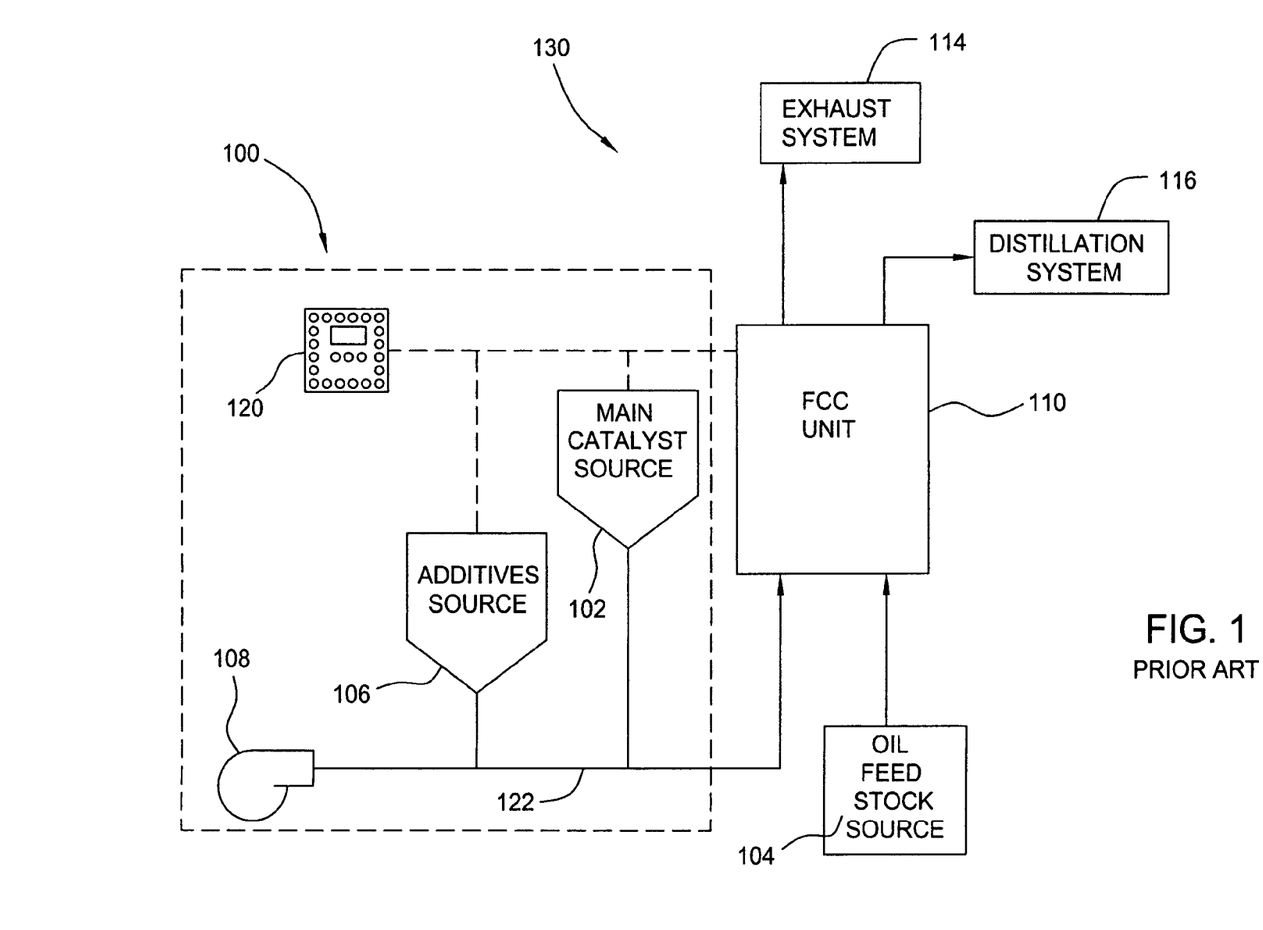
FIG. 1 is a simplified schematic view of a conventional fluid catalytic cracking system.

FIG. 1 is a simplified schematic of a conventional fluid catalytic cracking system 130. The fluid catalytic cracking system 130 generally includes a fluid catalytic cracking (FCC) unit 110 coupled to a catalyst injection system 100, an oil feed stock source 104, an exhaust system 114 and a distillation system 116. One or more catalysts from the catalyst injection system 100 and oil from the oil feed stock source 104 are delivered to the FCC unit 110, The oil and catalysts are combined to produce an oil vapor that is collected and separated into various petrochemical products in the distillation system 116. The exhaust system 114 is coupled to the FCC unit 110 and is adapted to control and/or monitor the exhausted byproducts of the fluid cracking process.

The catalyst injection system 100 includes a main catalyst source 102 and one or more additive sources 106. The main catalyst source 102 and the additive source 106 are coupled to the FCC unit 110 by a process line 122. A fluid source, such as a blower or air compressor 108, is coupled to the process line 122 and provides pressurized fluid, such as air, that is utilized to carry the various powdered catalysts from the sources 102, 106 through the process line 122 and into the FCC unit 110.

A controller 120 is utilized to control the amounts of catalysts and additives utilized in the FCC unit 110. Typically, different additives are provided to the FCC unit 110 to control the ratio of product types recovered in the distillation system 116 (i.e., for example, more LPG than gasoline) and to control the composition of emissions passing through the exhaust system 114, among other process control attributes. As the controller 120 is generally positioned proximate the catalyst sources 106, 102 and the FCC unit 110, the controller 120 is typically housed in an explosion-proof enclosure to prevent spark ignition of gases which may potentially exist on the exterior of the enclosure in a petroleum processing environment.

Due to the danger of spark ignition near the FCC system, the enclosures utilized to house the controller are configured to meet applicable government regulations, industrial standards and/or processor standards. For example, in the United States, the controller must be housed in Class I, Division 1 explosion-proof enclosure as described in Section 500 of the National Electric Code (NEC).

Explosion-proof enclosures meeting such safety standards typically include a cast metallic body having a lid bolted thereto utilizing a plurality of fasteners. Thus, access to the contents of the enclosure, e.g., a controller, requires a time-consuming process of removing a plurality of bolts. Moreover, as the controller is now exposed to the potentially hazardous environment, high-level authorization from plant operations management is typically required as certain processing activities must be stopped to minimize the presence of hazardous gases. In addition, special safety precautions are frequently required when opening the enclosure, such as monitoring the air in the region surrounding the enclosure for flammable gas content, provision of extra fire extinguishing equipment, covering or closing off of gratings over drainage channels, among other safety measures. Thus, servicing or obtaining items within the housing, such as a disk containing historical information regarding catalyst injection events from the controller, is both difficult and time consuming, and may require an interruption in processing activities.

Moreover as catalyst usage information is retrieved only periodically from the injection system, the amount of catalyst inventoried (i.e., catalyst warehoused and queued in the injection system) at a facility is often difficult to determine. Particularly, as catalyst injection may be unscheduled (i.e., not part of production planning) due to the instantaneous needs or to correct process trends, the rate of catalyst usage may vary while the amount of catalyst stored in the injection system may not be known until downloading that information from the injection systems controller. Thus, it is often difficult to predict when additional supplies of catalyst need to be delivered to a production facility. Furthermore, as many production facilities are located in remote regions of the world, lead times needed to deliver catalyst are often long, creating costly need to air freight catalyst to avoid adverse production results and/or quality or even shutdown of refinery operations.

In addition, reordering of catalyst inventory is normally initiated by high level employees such as refinery operations management personnel. This is due to the high dollar value of the catalyst being ordered which prevents this task being delegated to lower level employees. These operations management personnel are generally employed to carry out a variety of other tasks, many of which are of an immediate and urgent nature each day. Because reordering of catalyst is a function that does not take place on a frequent basis, this is a task that tends to be forgotten until it is too late, causing extra cost to the refiner and/or the supplier through having to air freight for express ship catalyst to the refinery in an emergency mode, rather than using more efficient and less costly surface transportation means.

At present, one way that operations managers deal with this situation is by over ordering catalyst. This is a very inefficient method of dealing with the problem as it leads to refiners having to carry excessively high inventories of expensive catalytic materials, tying up large amounts of capital. This method also frequently only postpones the "panic reordering" problem referred to above, rather than preventing it, as reordering is now even less frequent and is even more easily forgotten. Thus, a means of automating the reordering process will be of great benefit to refiners and to catalyst suppliers.

In addition to the demand of obtaining inventory data in a strategic manner, there is also a need to monitor the system for the occurrence of specific events. Certain events, such as the malfunction of the injection system, power failure, blockage in the catalyst delivery line, could prove to be problematic even if undetected for a small amount of time. Consequently, a means for communicating the occurrence of these events to the site operator, catalyst supplier, service technician, or other appropriate person, would be of considerable value. In addition, identifying even minor problems in such a fashion would enable a technician of remedying the problem earlier, thus preventing potentially greater problems in the future.

Therefore, there is a need for an improved method and apparatus for the automated monitoring of certain events and inventory data of a fluid catalytic cracking catalyst injection system.

SUMMARY OF THE INVENTION

A method for monitoring a FCC catalyst injection system is provided. In one embodiment, a method for monitoring a FCC catalyst injection system includes the steps of determining an occurrence of a pre-defined event and establishing communication between a control module of the catalyst injection system and a remote device in response to the event.

In another embodiment of the invention, a method is described for monitoring a FCC catalyst injection system which entails the acquisition of data from the injection system by a plurality of sensors. After the data is obtained, it is subsequently stored in the memory device of the control module. Communication is then established between a remote device and the control module to transmit the data.

DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 2:
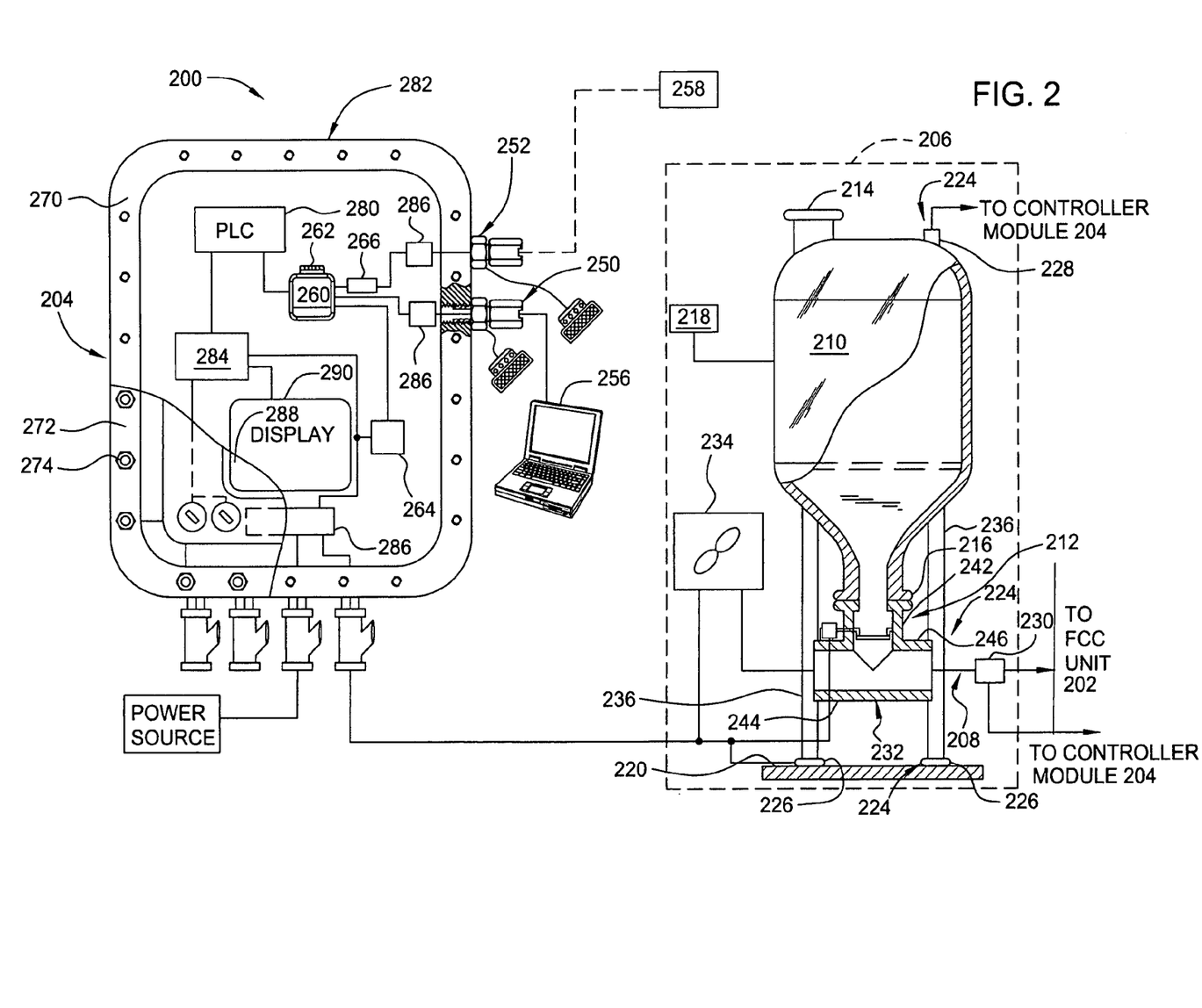
FIG. 2 is a simplified schematic diagram of a fluid catalytic cracking system illustrating an injection system depicting a first embodiment of a control module configured to provide local data access in accordance with one embodiment of the present invention.

FIG. 2 depicts one embodiment of a fluid catalytic cracking (FCC) system 200 comprising a control module 204 and an injection system 206 where the control module 204 is configured to facilitate local data access of information obtained from the injection system 206. The FCC system 200 also includes a fluid catalytic cracking (FCC) unit 202 coupled to a catalyst injection system 206. The FCC unit 202 is adapted to promote catalytic cracking of petroleum feed stock and may configured in a conventional manner. The injection system 206 is coupled to the FCC unit 202 and is configured to inject one or more catalysts into the FCC unit 202 to control processing attributes such as the ratio of products recovered in a distiller of the FCC unit 202 and/or to control the emissions from the FCC unit 202. The control module 204 is coupled to the injection system 206 to control the rates and/or amounts of catalyst provided to the FCC unit 202 by the injection system 206.

In one embodiment, the injection system 206 includes a storage vessel 210 coupled to a metering device 212. The metering device 212 is typically coupled to the control module 204 so that an amount of catalyst delivered to the FCC unit 202 may be monitored or metered. Exemplary injection systems that may be adapted to benefit from the invention are described in U.S. Pat. No. 5,389,236, issued Feb. 14, 1995, and in U.S. Pat. No. 6,358,401, Mar. 19, 2002, both of which are hereby incorporated by reference in their entireties. Other catalyst injection systems that may be adapted to benefit from the invention are available from Intercat, Inc., headquartered in Sea Girt, N.J., USA.

The storage vessel 210 is typically a metal container having a fill port 214 and a discharge port 216. Typically, the discharge port 216 is positioned at or near a bottom of the storage vessel 210. The storage vessel 210 is coupled to a pressure control apparatus 218 that controls the pressure within the storage vessel 210. The pressure control apparatus 218 generally pressurizes the storage vessel 210 to about 5 to about 60 pounds per square inch (about 0.35 to about 4.2 $kg/cm^2$) during dispensing operations. The apparatus 218 intermittently vents the storage vessel 210 to about atmospheric pressure to accommodate recharging the vessel 210 with catalyst.

A metering device 212 is coupled to the discharge port 216 to control the amount of catalyst injected from the storage vessel 210 to the FCC unit 202. The metering device 212 may be a shut-off valve, a rotary valve, a mass flow controller, a shot pot, a flow sensor, a positive displacement pump or other devices suitable for regulating the amount of catalyst dispensed from the storage vessel 210 for delivery to the FCC unit 202. The metering device 212 may determine the amount of catalyst by weight, volume, timed dispense or by other manners. Depending on the catalyst requirements of the system 100, the metering device 212 is typically configured to provide about 5 to about 4000 pounds per day of additive-type catalysts (process control catalyst) or may be configured to provide about 1 to about 20 tons per day of main catalyst. The amount of catalyst to be dispensed over a predefined period of time is an input variable to the control module 204 and is generally referred to as the catalyst setpoint. The metering device 212 typically delivers catalysts over the course of a planned production cycle, typically 24 hours, in multiple shots of predetermined amounts spaced over the production cycle. However, catalysts may also be added in an "as needed" basis.

In the embodiment depicted in FIG. 2, the metering device 212 is a control valve 232 that regulates the amount of catalyst delivered from the storage vessel 210 to the FCC unit 202 by a timed actuation. The control valve 232 generally includes a first port 242 that is coupled to the discharge port 216 of the storage vessel 210. A second port 244 of the control valve 232 is coupled to a portion of the delivery line 208 leading from a fluid source 234 such as a blower or compressor. A third port 246 of the control valve 232 is coupled to a portion of the delivery line 208 leading to the FCC unit 202. When actuated to an open position, the control valve 232 allows catalyst to flow from the storage vessel 210 towards the third port 246, where fluid provided from the fluid source 234, moving from the second port 244 towards the third port 246 entrains and carries the catalyst to the FCC unit 202. In one embodiment, the fluid source 234 provides air at about 60 psi (about 4.2 kg/cm$^2$).

Figure 3:
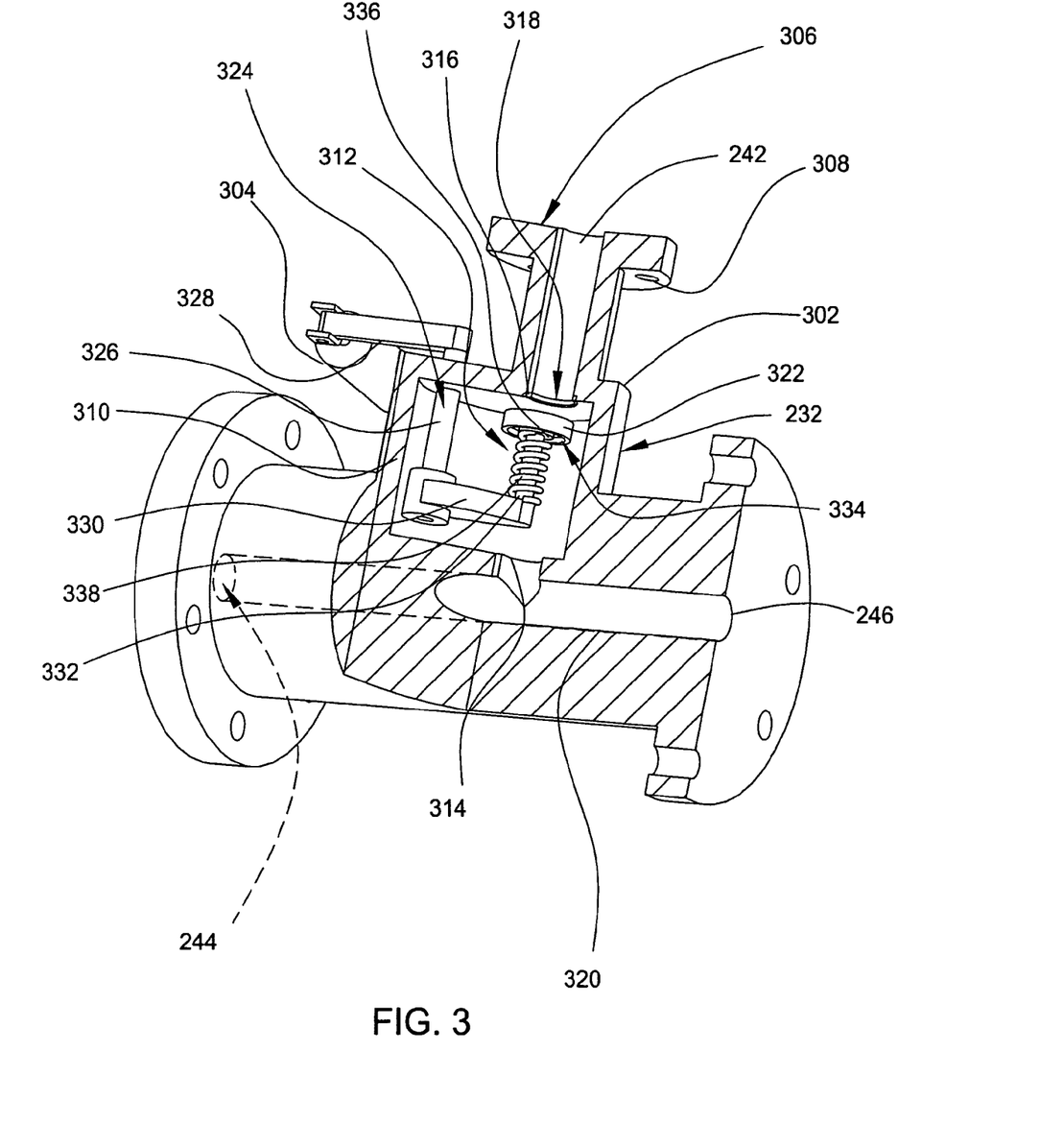
FIG. 3 is a sectional, isometric view of one embodiment of a control valve used in conjunction with the present invention.

FIG. 3 is a sectional, isometric view of one embodiment of the control valve 232. The control valve 232 includes a valve body 302 and an actuator 304. The valve body 302 includes a first flange 306 having the first port 242 formed there through. The first flange 306 also includes a plurality of mounting holes 308 to facilitate coupling the valve body 302 to the discharge port 216 of the storage vessel 210 shown in FIG. 2. The first flange 306 is coupled to a housing 310. The housing 310 of the valve body 302 defines a cavity 312 that is coupled to the first port 242 by a valve seat 316 disposed at one end and a first passage 314 coupled to a second passage 320 (shown in partially in phantom) that couples the second and third ports 244, 246 at a second end. The valve seat 316 has an orifice 318 formed there through that fluidly couples the cavity 312 to the discharge port 216 of the storage vessel 210 (shown in FIG. 2). The orifice 318 is typically between about ⅞ to about 1-¾ inches in diameter.

The orifice 318 of the control valve 232 is opened and closed by selectively moving a shear disk 322 laterally across the seat 316. The shear disk 322 generally has a lapped metallic upper sealing surface that seals against the valve seat 316, which is typically also metallic. As the shear disk 322 is disposed on the downstream side of the valve seat 316, any backpressure generated in the FCC unit 202 will not inadvertently open the valve 232.

An actuator assembly 324 couples the shear disk 322 to the actuator 304 that controls the open and closed state of the control valve 232. The actuator assembly 324 includes a shaft 326 that extends through the housing 310. A first arm 328 of the actuator assembly 324 is coupled to an end of the shaft 326 disposed on the outside of the housing 310. A second arm 330 of the actuator assembly 324 is coupled to an end of the shaft 326 disposed in the cavity 312 of the housing 310. A pin 332 extends from the second arm 330 and engages the shear disk 322. A recess 334 formed in a lower surface of the shear disk 322 receives the pin 332 and prevents the pin 332 and shear disk 322 from becoming disengaged as the pin 332 urges the shear disk 322 laterally over or clear of the orifice 318.

An annular bushing 336 residing in the recess 334 circumscribes the end of the pin 332. The bushing 336 is retained by the pin 332 and can move axially along the pin 332. A diameter of the bushing 336 is generally less than a diameter of the recess 334 to that the shear disk 322 may rotate eccentrically round the bushing 336 and the pin 332 as the shear disk 322 is moved laterally.

A spring 338 is disposed around the pin 332 between the second arm 330 and the bushing 336. The spring 338 biases the bushing 336 and the shear disk 322 away from the second arm 330 and against the valve seat 316 so that the shear disk 322 seals the orifice 318 when the shear disk 322 is positioned over the valve seat 316.

As depicted in FIG. 3, the actuator 304 is coupled to the first arm 328 and rotates the shaft 326 to move the shear disk 322 between positions that open and close the orifice 318. As the pin and bushing 332, 336 have a diameter smaller than the recess 324 formed in the shear disk 322, the shear disk 322 precesses about the shaft 326 as the control valve 232 is opened and closed (i.e., the shear disk 322 rotates eccentricity about the pin 332 while additionally rotating about the shaft 326). This motion of the shear disk 322 over the valve seat 316 provides a self-lapping, seat cleaning action that prevents the catalyst from grooving the sealing surfaces of the shear disk 322 and valve seat 316 that could cause the valve leakage. It has been found that this configuration of valve operation substantially extends the service life of the valve 232. Other control valves may alternatively be utilized.

Referring back to FIG. 2, the injection system 206 may also include one or more sensors 224 for providing a metric suitable for resolving the amount of catalyst passing through the metering device 212 during each injection of catalyst. The sensors 224 may be configured to detect the level (i.e., volume) of catalyst in the storage vessel 210, the weight of catalyst in the storage vessel 210, the rate of catalyst movement through the storage vessel 210, discharge port 216, metering device 212 and/or catalyst delivery line 208 and the like.

In the embodiment depicted in FIG. 2, the sensor 224 is a plurality of load cells 226 adapted to provide a metric indicative of the weight of catalyst in the storage vessel 210. The load cells 226 are respectively coupled to a plurality of legs 236 that supports the storage vessel 210 above a surface 220, such as a concrete pad. Each of the legs 236 has one load cell 226 coupled thereto. The control module 204 receives the outputs of the load cells 226. From sequential data samples obtained from the load cells 226, the control module 204 may resolve the net amount of injected catalyst after each actuation of the metering device 212. Additionally, the net amount of catalyst dispensed over the course of the production cycle may be monitored so that variations in the amount of catalyst dispensed in each individual shot may be compensated for by adjusting the delivery attributes of the metering device 212, for example, changing the open time of the control valve 232 to allow more (or less) catalyst to pass there through and into the FCC unit 202.

Alternatively, the sensor 224 may be a level sensor 228 coupled to the storage vessel 210 and adapted to detect a metric indicative of the level of catalyst within the storage vessel 210. The level sensor 228 may be an optical transducer, a capacitance device, a sonic transducer or other device suitable for providing information from which the level or volume of catalyst disposed in the storage vessel 210 may be resolved. By utilizing the sensed differences in the levels of catalyst disposed within the storage vessel 210 between dispenses, the amount of catalyst injected may be resolved for a known storage vessel geometry.

Alternatively, the sensor 224 may be a flow sensor 230 adapted to detect the flow of catalyst through one of the components of the catalyst injection system 206. The flow sensor 230 maybe a contact or non-contact device and may be mounted to the storage vessel 210, the metering device 212 or the catalyst delivery line 208 coupling the storage vessel 210 to the FCC unit 202. In the embodiment depicted in FIG. 2, the flow sensor 230 may be a sonic flow meter or capacitance device adapted to detect the rate of entrained particles (i.e., catalyst) moving through the delivery line 208.

The control module 204 generally includes a controller 280 housed in an enclosure 282 that is suitable for service in hazardous locations. In one embodiment, the enclosure 282 is fabricated in accordance with NEC 500 Division 1, Class 1, or other similar standard.

The enclosure 282 includes a housing 270 having a cover 272 fastened thereto by a plurality of bolts 274. The housing 270 and cover 272 are typically fabricated from cast aluminum and have machined mating services that form a sealed cavity.

The controller 280 may be any suitable logic device for controlling the operation of the catalyst injection system 206. In one embodiment, the controller 280 is a programmable logic controller (PLC), such as those available from GE Fanuc. However, from the disclosure herein, those skilled in the art will realize that other controllers such as microcontrollers, microprocessors, programmable gate arrays, and application specific integrated circuits (ASICs) may be used to perform the controlling functions of the controller 280.

The controller 280 is coupled to various support circuits 284 that provide various signals to the controller 280. These support circuits include, power supplies, clocks, input and output interface circuits and the like. One of the support circuits 284 is coupled to a display 290 that displays process information and/or system status. The display 290 can be viewed through a window 288 disposed in the cover 272 of the enclosure 282. Another one of the support circuits 284 couples the sensors 224 to the controller 280.

All signals to and from the controller 280 and the support circuits 284 that pass to the exterior of the enclosure 282 must pass through an intrinsically safe barrier 286 to prevent power surges that may potentially ignite fumes present in the environment surrounding the enclosure 282. In one embodiment, the intrinsically safe barrier 286 is a Zener diode that substantially prevents voltage spikes from leaving the enclosure 282. The Zener diode is coupled from a conductive path carrying the signal to or from the interior of the enclosure 282 to ground. As such, any voltage spikes that exceed the breakdown voltage of the Zener diode will be shorted to ground and, thus, not leave the enclosure 282.

The controller 280 typically includes or is coupled to a processor 260 that manages data provided by the sensors 224. In one embodiment, the processor 260 is coupled to the controller 280 and powered by a power source 264 disposed within the enclosure 282. The processor 260 writes information from the system 100 to a memory device 262. The information recorded in the memory device 262 may include data from the sensors 224 indicative of the amount of catalyst injected into the FCC unit 110, error messages from the controller 280, a record of operator activity, such as refilling the addition system, times of manually interrupting and restarting additions, any additions that are made manually which are in addition to any controlled additions, and an hourly weight record of how much catalyst is left in the storage vessel 210, among other information available to the controller 280 regarding system activity. The memory device 262 may be in the form of a hard disk, a floppy drive, a compact disc, flash memory or other form of digital storage. In one embodiment, the processor 260 is a C-Engine processor manufactured by ADPI, located in Troy, Ohio.

At least a first communication port 250 is coupled through the intrinsically safe barrier 286 to the processor 260 and/or controller 280 to facilitate communication with a device outside the enclosure 280. For example, the first communication port 250 accessible from the exterior of the enclosure 280 may provide access to data stored in the memory device 262. The first communication port 250 may alternatively be utilized to communicate with the controller 280, for example, to revise the ladder logic stored in the PLC. In the embodiment depicted in FIG. 2, the first communication port 250 is coupled to a local device 256, such as a lap top computer or PDA, to access data stored in the memory device 262. The ability to extract and/or access catalyst consumption information and/or other data stored in the memory device 262 of the processor 260 from a local device 256 without having to unbolt the cover 272 from the enclosure 280 to access the memory device 262 eliminates the need for access authorization and the associated downtime involved with opening the enclosure 282.

The first communication port 250 may be a serial port or a parallel port having one or more conductors that penetrate the wall of the enclosure. For convenience, a standard RS-232-type jack that is configured for uses in this environment may be utilized. The first communication port 250 penetrates housing 270 or cover 272 of the enclosure 280 to enable data communications to occur with the controller while the enclosure 280 remains sealed. The processor 260 is programmed in a conventional manner to utilize the first communication port 250.

In the embodiment depicted in FIG. 2, a second communication port 252 may pass through the housing 270 or cover 272 of the enclosure 282. The second communication port 252 is coupled through the intrinsically safe barrier 286 to a modem 266. The modem 266 enables the processor 260 to communicate to a communications network such as a wide area network, thereby allowing the memory device 262 of the processor 260 to be accessed from a remote device 258 over fixed communication lines, such as a telephone line, ISDN, DSL, T1, fiber optic and the like. The modem 266 may also be an Ethernet card coupled to a remote device 258 in the form of a computer network. As such, the remote device 258 may be a server or any computer terminal that interacts with the system 200 via the Internet. Alternatively, the modem 266 may facilitate wireless telephonic/data communication, i.e., the modem may be a wireless modem. In one embodiment, the remote device 258 may be a computer terminal located or accessed by a catalyst supplier or the production facility's inventory controller/planner.

Figure 4:
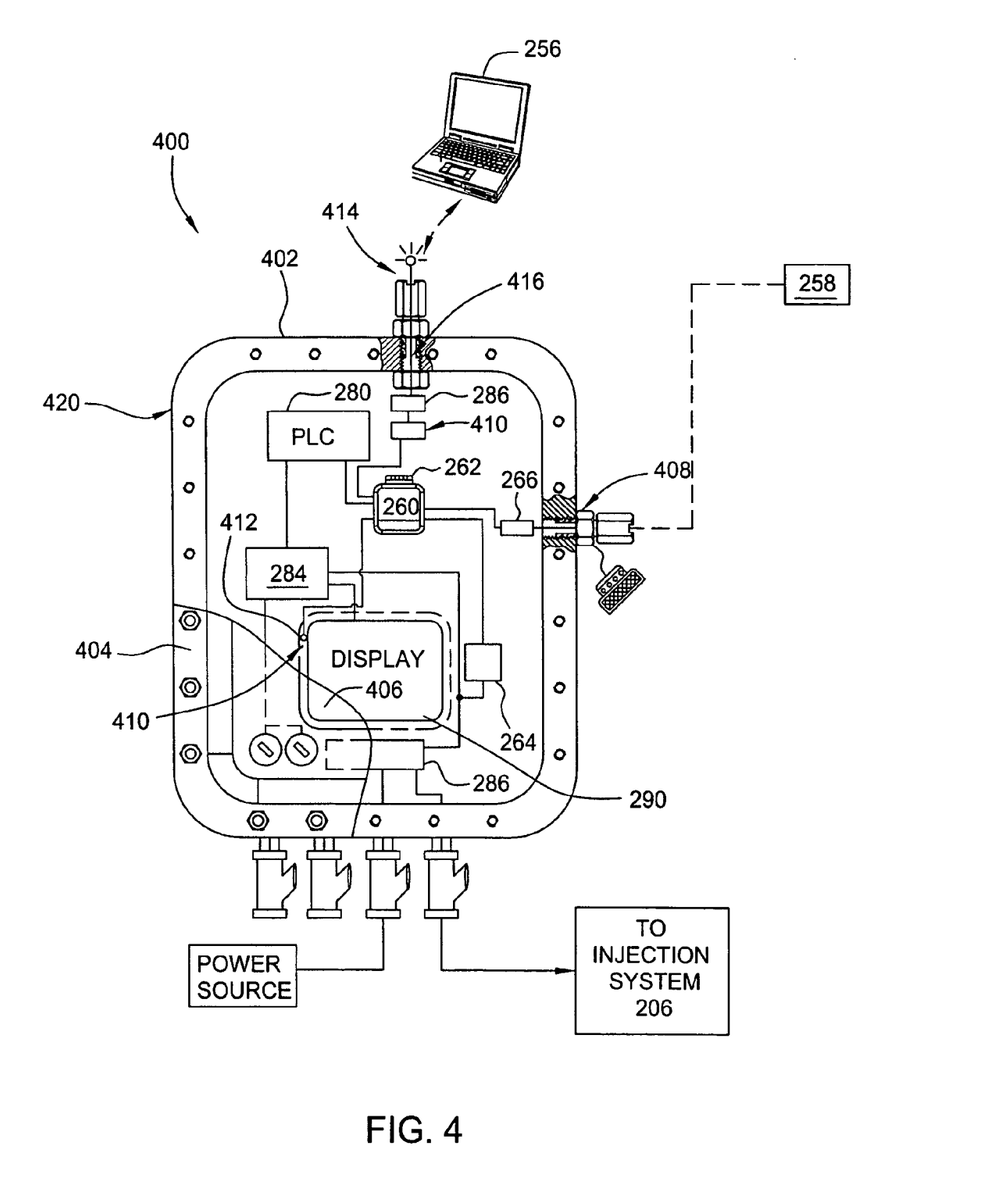
FIG. 4 is a simplified schematic view of another embodiment of a control module configured to provide local data access.

FIG. 4 is a simplified schematic of another embodiment of a control module 400 configured to provide local data access. The control module 400 generally includes a housing 402 and a cover 404 that define a hazardous duty enclosure 420 that houses a controller 280. The controller 280 is generally coupled to the injection system 206 through an intrinsically safe barrier 286 disposed in the enclosure 420.

The controller 280 is coupled to a processor 260 that manages a memory device 262 of the injection system. Local access to the memory device 262 is provided through a wireless transceiver 410 and a coupler 414 such as an antenna. The transceiver 410 is located within the enclosure 420 and is coupled through the intrinsically safe barrier 286 to an electrical connector 416 that penetrates the enclosure 420. The coupler 414 is coupled to the connector 416 on the outside of the enclosure 420 such that signals can be coupled between a remote device 256 and the processor 260 via the coupler 414. The remote device 256 may be a lap top computer or PDA that is brought within communication range the coupler 414. The communication between the remote device 256 and the transceiver 410 may be accomplished using, for example, a standard IEEE 802.11 protocol or some other wireless data communications protocol.

Alternatively, the coupler 414 may be disposed within the enclosure 420 such that signals can be coupled to and from a remote device 256 through a material transmissive to the signal comprising at least a portion of the enclosure 420. For example, the signal may pass through a window 406 formed in the enclosure 420, shown disposed in the cover 404 in FIG. 4. Alternatively, at least one of the housing 402 or cover 404 of the enclosure 420 may be at least partially fabricated from the material transmissive to the signal between the remote device 256 and the transceiver 410.

In another embodiment, the transceiver 410 may be an optical transceiver 412 positioned within the enclosure 420 and the coupler 414 may be an opto-coupler. As such, information may be "beamed" through the window 406, dispose disposed in the cover 404. Optionally, the control module 400 may additionally include a second communication port 408 accessible from the exterior of the enclosure 420 that is coupled to the processor 260 via a modem 266.

Although the injection system 206 described above is shown configured to provide catalyst from a single storage vessel 210, the invention contemplates utilizing one or more injection systems coupled to the FCC unit 202 to introduce multiple catalysts from a plurality of storage vessels, each of which may be controlled by common or independent control modules.

Figure 5:
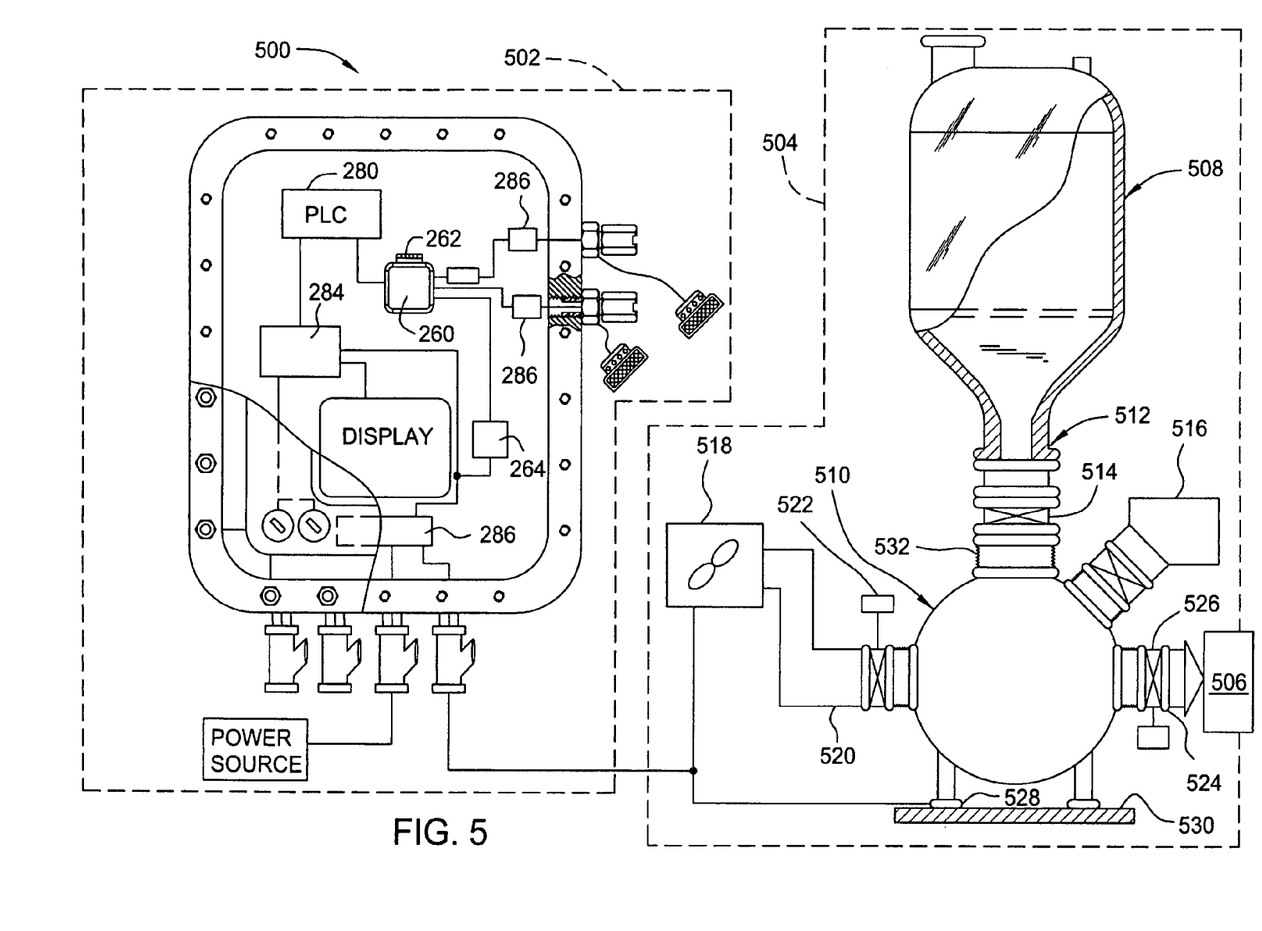
FIG. 5 is a simplified view of another embodiment of an injection system.

FIG. 5 is a simplified view of another embodiment of an injection system. The system 500 includes a control module 502 for controlling a catalyst injection system 504 coupled to a FCC unit 506. The controller 502 is substantially similar to the control modules described above.

The injection system 504 includes a bulk storage vessel 508 and a shot pot 510. The storage vessel 508 is generally adapted to store catalyst therein at substantially atmospheric pressures. A discharge port 512 of the storage vessel 504 is coupled by a shut-off valve 514 to the shot pot 510. The shut-off valve is periodically selectively opened to fill the shot pot 510 with catalyst. Once the shot pot 510 is filled with a pre-defined amount of catalyst, the shut-off valve 514 is closed, and the shot pot 510 is pressurized by a pressure control system 516 that elevates the pressure of the catalyst and gases within the shot pot 510 to a level that facilitates injection of the catalyst into the FCC unit 506, typically at least about 10 pounds per square inch.

A fluid handler 518 is coupled to the shot pot 510 by a first conduit 520. The first conduit 520 includes a shut-off valve 522 that selectively isolates the fluid handler 518 from the shot pot 510. A second conduit 524 couples the shot pot 510 to the FCC unit 506 and includes a second shut-off valve 526 that selectively isolates the shot pot 510 from the FCC unit 506. Once the shot pot 510 is filled with catalyst and the shut-off valve 514 is closed, the shot pot 510 is brought up to pressure and the shut-off valves 522, 526 are opened to facilitate movement of the catalyst from the shot pot 510 to the FCC unit 506 by air delivered through the shot pot 510 by the fluid handler 518.

The weight of the shot pot 510 is monitored to control the amount of catalyst dispensed into the shot pot 510 from the storage vessel 508. A plurality of load cells 528 are typically coupled between the shot pot 510 and a mounting surface 530 to provide the control module 502 with a metric indicative of the weight of the catalyst and shot pot 510 which may be utilized to resolve the amount of catalyst in the shot pot 510. In order to provide the necessary isolation of the shot pot 510 from its surrounding components needed to obtain accurate data from the load cells 528, a plurality of bellows 532 are coupled between the shut-off valves 514, 522, 526 and the pressure control system 516. The bellow 532 allow the shot pot 510 to move independently from the conduits and other components coupled thereto so that substantially all of the weight of the shot pot 510 and catalyst disposed therein is borne on the load cells 528.

Thus, an injection system has been provided that facilitates remote communication with a control module of the system. In one embodiment, the inventive system allows data residing in a memory device disposed in the control module to be accessed without compromising the safety device of an enclosure housing the memory device. In another embodiment, communication may be remotely established with the system's controller.

In another aspect of the invention, the ability to extract catalyst inventory/use information from the memory device of the processor enables catalyst inventory/usage to be remotely monitored. Thus, catalyst inventory control may be accurately monitored to determine the need for catalyst inventory replenishment at periodic intervals by either the processor's production planner/inventory control or by the catalyst supplier. The inventory control may occur locally, on-site or remotely using the information extracted through the modem. The system may be configured to allow the site operator, vendor, regulatory body or other authorized person to monitor catalyst inventory control, thereby insuring adequate catalyst supply on-site, thereby preventing loss of process control during oil refining due to catalyst shortage.

Figure 6:
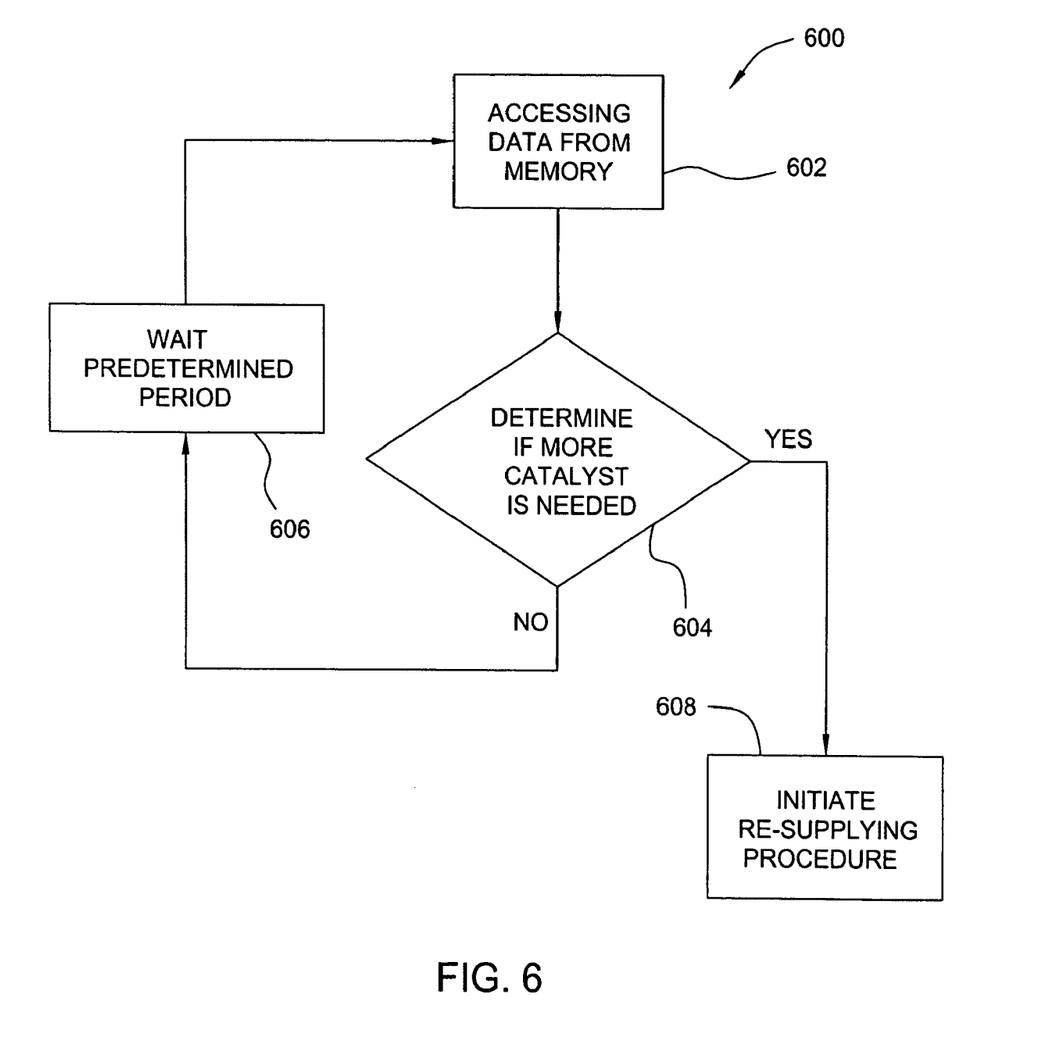
FIG. 6 is a flow diagram of one embodiment of a method for monitoring catalyst inventory/usage.

FIG. 6 depicts a flow diagram of one embodiment of a method 600 for monitoring catalyst inventory/usage. The method 600 is generally stored in the memory device 262 or in other memory of the controller 280, typically as a software routine. The software routine may also be stored and/or executed by a second CPU (not shown) that is remotely located from the hardware being controlled by the controller 280. Although the process 600 is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware.

The method 600 begins at step 602 by accessing the data stored in the computer memory device 262. The data may be accessed as discussed above, for example in the injection system 206 depicted in FIG. 2, through either one of the first communication port 250 to a local device 256, such as a lap top computer or PDA, or the communication port 252 to a remote device 258, such as a computer terminal that may be located at the supplier and/or processor. Step 602 may be initiated by the local or remote devices 256, 258, or the control module 204.

At step 604, a determination is made if catalyst inventories are below a predetermined amount, for example, a reorder level. The reorder level is typically set by the processor's production planner/inventory control and is usually based on planned catalyst consumption, product mix, historical data, catalyst lead times and the like. The reorder level may alternatively be set by the catalyst supplier.

In one embodiment where the bulk storage vessel is the sole source of catalyst, the determination of step 604 may be made by dividing the remaining inventory by the daily addition rate to yield the remaining days of catalyst left. Catalyst is needed if the number of days of catalyst left is less than a reordering level set by the catalyst delivery lead time plus a margin of safety. Alternatively, the remaining inventory of the catalyst disposed in the bulk storage vessel may be directly compared with a reorder level in the form of the weight of catalyst.

The remaining inventory may be determined in a variety of manners. In one embodiment, the remaining inventory is calculated by subtracting the amount of catalyst dispensed from the bulk storage vessel from the initial amount of catalyst loaded in the bulk storage vessel. In another embodiment, the remaining inventory is calculated by the weight of catalyst remaining in the bulk storage vessel.

In embodiments where the processor has catalyst inventory available in addition to catalyst disposed in the bulk storage vessel, the remaining inventory used in the determination must include the catalyst readily available to the processor along with the catalyst disposed in the bulk storage vessel for comparison to the reorder level. The catalyst readily available to the processor may include at least one or more of catalyst inventory located on site, warehoused or at another production facility. The catalyst readily available may be keyed into or electronically available to the controller 280, remote device 258 or other equipment executing the software routine embodying the method instructions, and may be obtained from the processors master production schedule (MRP) or inventory control software, receiving records, physical inventory counts and the like. The catalyst readily available must also be reconciled with catalyst transferred to the bulk storage vessel.

If a determination that no additional catalyst is needed, a predetermined period is waited at step 606 before accessing the data to repeat step 602. The waiting period of step 606 may be selected to reflect a planned rate of catalyst consumption. The waiting period of step 606 may alternatively be selected based on the proximity of the site's current catalyst inventory to the reorder level. The waiting period may also be random. In one embodiment, the predetermined period is set to expire at the completion of a selected number of catalyst injections ranging from one to a plurality of injections.

If a determination is made that additional catalyst is needed, a re-supplying procedure is initiated at step 608. The re-supplying procedure 608 may vary depending on the entity monitoring the catalyst inventory. For example, if the processor is monitoring the catalyst inventory, the re-supplying procedure 608 may include one or more of the steps of moving catalyst inventories between facilities, determining an amount of catalyst to re-order, and placing a catalyst order with the catalyst supplier. If the catalyst supplier is monitoring the catalyst inventory, the re-supplying procedure 608 is based on a re-supplying protocol established between the catalyst supplier and the processor.

Figure 7:
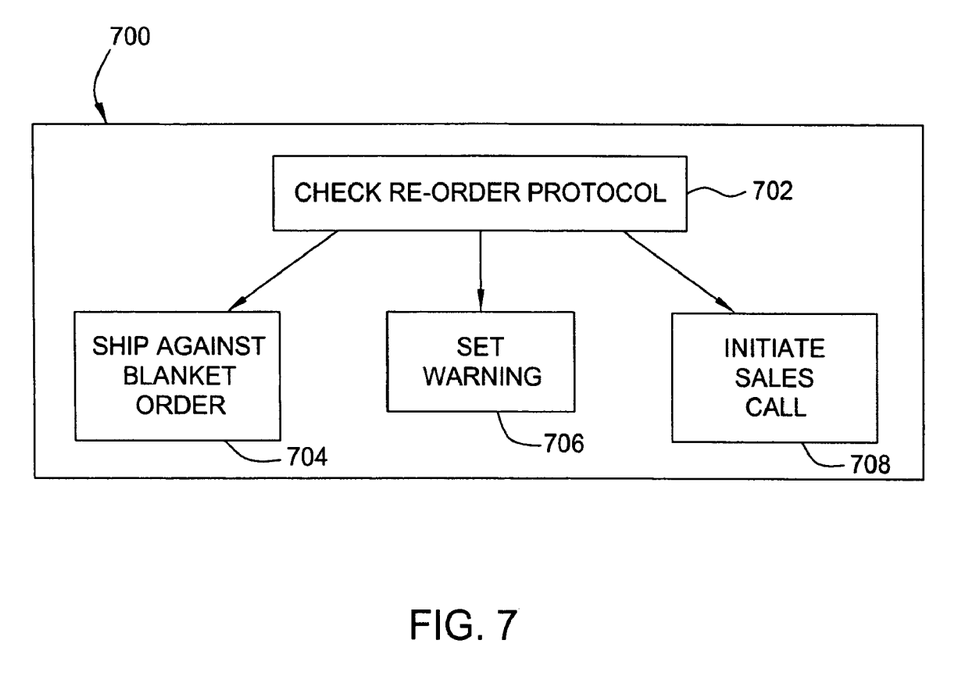
FIG. 7 is a flow diagram of one embodiment of a resupplying procedure.

FIG. 7 is a flow diagram of one embodiment of a re-supplying procedure 700 that may be utilized by a catalyst supplier or other entity. The re-supplying procedure 700 beings at step 702 by checking a re-order protocol established between the buyer (e.g., the processor) and the supplier. If the protocol instructs the supplier to ship more catalyst against a blanket order when the catalyst inventories are below the reorder level, then a shipment of catalyst is made at step 704.

If the protocol directs the processor be notified when the catalyst inventories are below the reorder level, then a warning indicator may be is set (i.e., activated or initiated) at step 706. The warning indicator may in the form of a warning signal, for example a light and/or sound, on the control module 204, a warning signal activated in a remote location with the processor, an automatic message, for example, telephonic or electronic mail, sent to a person (or entity) designated by the processor (or supplier), or other type of warning indicia for indicating the status of inventory levels. In one embodiment, an electronic warning signal is sent to the processor, resulting in the automatic generation of a purchase order for additional catalyst.

If the protocol requires notification of the processor's purchasing or planning personnel when the catalyst inventories are below the reorder level, then a sales call by the supplier is initiated at step 708. The sales call may be initiated by contacting the processor through an automatic telephonic or electronic mail message, or by through a sales call by telephonic, electronic or personal means.

In another aspect of the invention, the processor monitors catalyst inventory/use information in-situ and issues a signal indicative of inventory levels. The signal may be directed to the processor for use in reordering catalyst, or to the supplier for initiating re-supplying procedures similar to those discussed with reference to FIG. 7. As the injection system monitors inventory levels in-situ and issues a signal only when catalyst is needed, the number of communications with remote devices are substantially reducing the amount of non-critical data transmitted.

Figure 8:
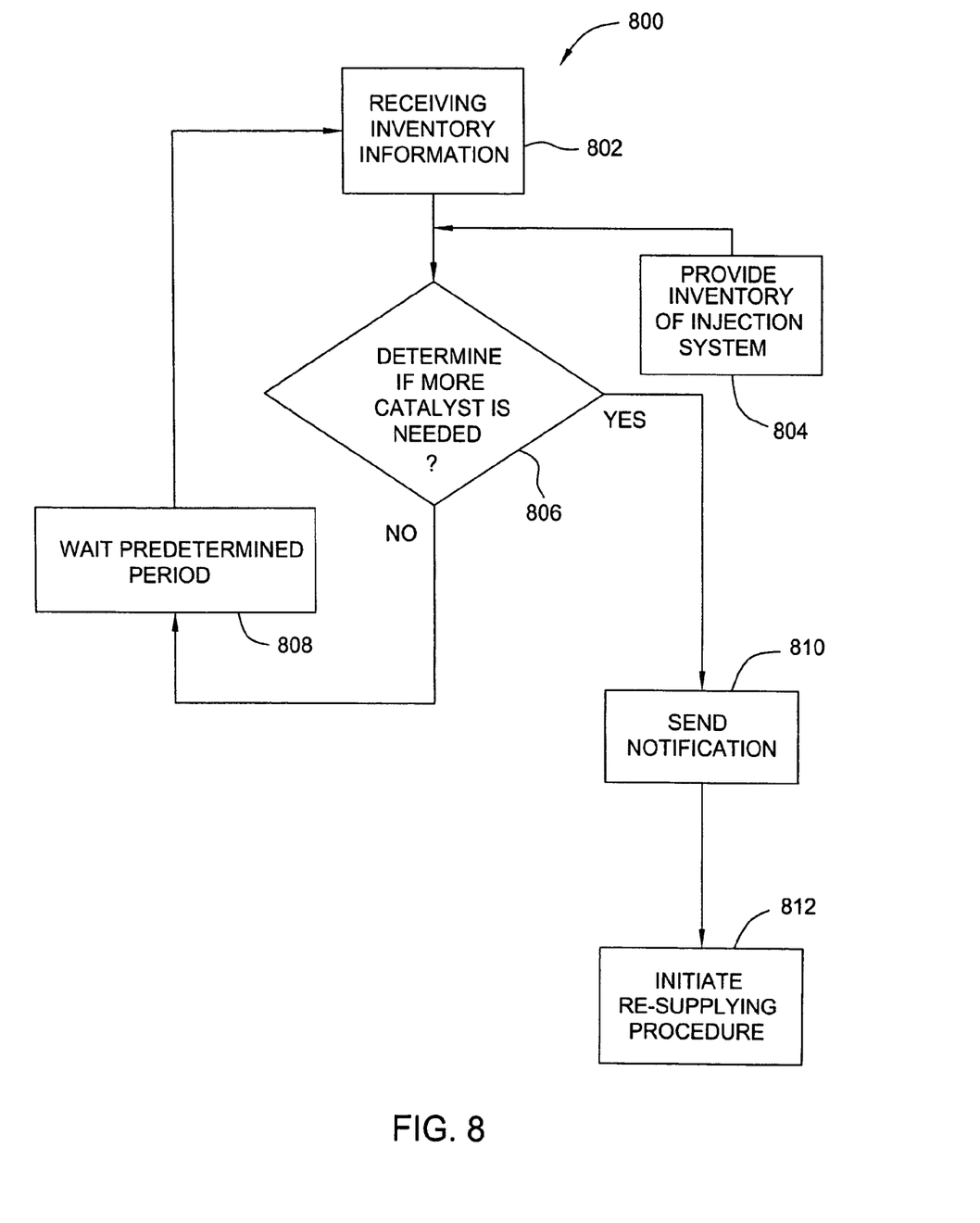
FIG. 8 is a flow diagram of another embodiment of a method for monitoring catalyst inventory/usage.

FIG. 8 is a flow diagram of another embodiment of a procedure 800 for monitoring catalyst inventory/usage. The procedure 800 begins at step 802 by receiving site catalyst inventory information by the controller 280. The controller 280 may receive site inventory information though one of the ports 250, 252, though the control modules operator interface, in one example, the display 290 may be configured as a touch screen, or through exchange of the memory device 262 and the like. The site inventory information is stored in the memory device 262. In one embodiment, the site catalyst inventory information is provided to the memory device 290 from the one of the production planner/inventory controller based on shipments received or ordered. Alternatively, the supplier may update the site inventory information based catalyst shipments made.

At step 804, catalyst inventory of the injection system 206 is provided to the controller 280 as discussed above. The catalyst inventory of the injection system 206 includes catalyst currently stored in the storage vessel 210 of the injection system 206.

At step 806, a determination is made by the controller 280 if whether more catalyst is needed. The determination is made by addition of the site catalyst inventory information obtained at step 802 and the catalyst inventory of the injection system 206 obtained at step 804 and comparing the sum to a reorder level as discussed above.

If no additional catalyst is needed, the controller 280 waits predetermined period at step 808 before returning to step 806. The predetermined period may be set as discussed above, or alternatively, set to include any combinations of catalyst injections, bulk vessel refills or updated site catalyst inventory information received by the controller 280.

If additional catalyst is needed, the controller 280 issues a notification at step 810. The notification may be telephonic signal or message, electronic mail or other message automatically generated and sent through one of the first or second communication ports 250, 252. In one embodiment, the notification is sent to the catalyst supplier.

After the notification at step 810, re-supplying procedures are initiated at step 812. The re-supplying procedures are similar to those described above and described with reference to FIGS. 6 and 7.

The process of monitoring catalyst inventory may also be utilized to confirm how much catalyst is consumed by the processor. For example, the amount of catalyst on site at the last iteration plus the amount of catalyst shipped since then minus the total catalyst injections into the FCC unit over the same period will equal the remaining inventory. Additionally, when the addition history is retrieved, the refilling history data can also be retrieved, which will indicate how many times the system was refilled, and with how much material. This is a useful cross check against physical inventory counts.

The method of monitoring catalyst requirements of a fluid catalytic cracking catalyst injection system facilitates remote inventory monitoring of catalyst utilized in a FCC system. Thus, catalyst inventory control may be accurately monitored to determine the need for catalyst inventory replenishment at periodic intervals by either the processor's production planner/inventory control or by the catalyst supplier.

In one embodiment, the inventive method allows a supplier to initiate re-supplying procedures based on current processing site catalyst inventories without interfacing directly with the processor. The method advantageously prevents the processor from costly having to expedite catalyst delivery or exhausting catalyst supplies, which could result in deviation from planned processing parameters and product mix, loss of process control, and possible production facility shut down.

Figure 9:
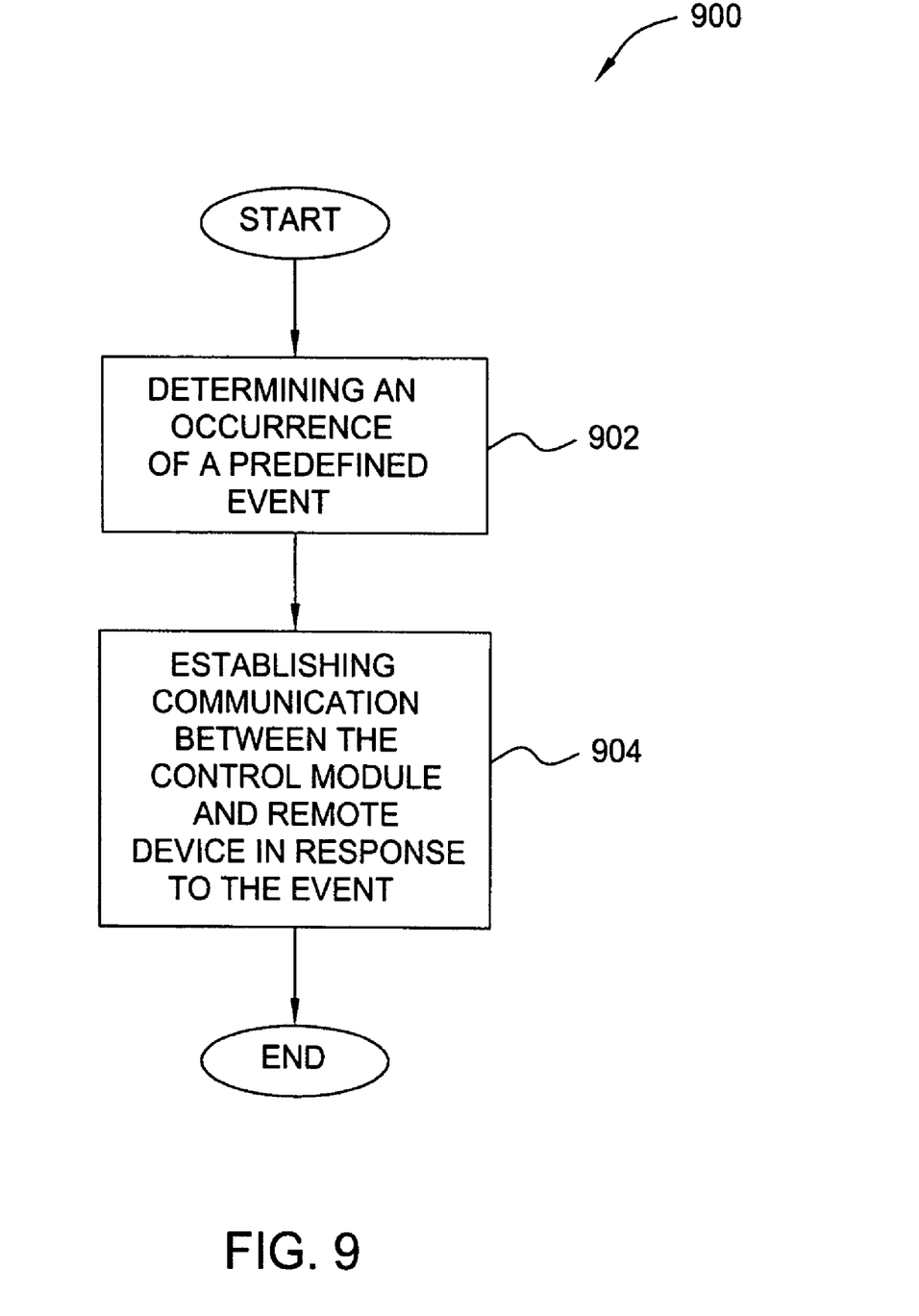
FIG. 9 is a flow diagram of one embodiment of a method for monitoring a catalyst injection system.

FIG. 9 shows a flow diagram of another embodiment of a method 900 for monitoring an injection system of the present invention. The method 900 commences at step 902 in which the controller 280 of the control module 204 determines the occurrence of a predefined event. At step 904, the controller 280 establishes communication and transmits information between the control module 204 and at least one of a local or remote device, 256, 258 in response to the event. In the context of this invention, an event can be defined as an occurrence or happening that has been identified as having meaningful significance to the operation of the injection system 206. Examples of events include, but are not limited to, a setpoint change, a manual injection of catalyst, a refilling of the storage vessel 210 with catalyst, a blocked or impeded discharge port 216, an unscheduled interruption of the injection process, a recalibration of the injection system 206, a malfunction of the controller 280, a pressure deviation in the storage vessel 210, a pressure deviation within the injection system 206, a pressure deviation within the pressure control system 516 (i.e., a pump malfunction), a deviation in the flow of catalyst from the injection system 206, a deviation from a planned catalyst injection schedule, low catalyst inventory levels, a temperature deviation within the storage vessel 210, a temperature deviation within the injection system 206, a failure of a sensor 224, an injection system alarm, a loss of power in the injection system 206, any controller alarm condition, and the like.

Certain events may be further classified either as a threshold dependent event or a threshold independent event. A threshold dependent event has a metric indicative of the event having a magnitude that is compared to a predefined threshold to determine if the communication, established at step 904, is triggered. For example, the threshold can be a predefined magnitude, such as a pressure or temperature level. Similarly, the threshold can also be described as a magnitude spectrum, such as a range of pressures or temperatures. The threshold may be a predefined number of event (above and/or below the threshold) occurrences over a specified time period. Events having a magnitude exceeding the predefined threshold are labeled by the controller 280 as a reportable event which trigger the communication of step 904. For instance, an exemplary threshold dependent event may be the decrease of pressure in the storage vessel 210 below a predefined pressure level threshold, thereby indicating to the controller 280 of a reportable threshold dependent event. It is also contemplated that it may be desirable to record to the memory device 262 of the control module 204 the occurrences of threshold dependent events which do not rise to the level of a reportable event for later evaluation and analysis, or to be maintained in memory until the number of occurrences give rise to reportable event.

Other examples of reportable, threshold dependent events include, but are not limited to, a blocked or impeded discharge port 216, a pressure deviation in the storage vessel 210, a pressure deviation within the injection system 206, a pressure deviation within the pressure control system 516 (e.g., a pump malfunction), a deviation in the flow of catalyst from the injection system 206, a deviation from a planned catalyst injection schedule, a temperature deviation within the storage vessel 210, a temperature deviation within the injection system 206, and the like.

A threshold independent event is an event that may be recorded and/or reported without a comparison to a predefined threshold or limit, thereby causing the controller to establish communication at step 904. More specifically, a threshold independent event can be described as an absolute and definitive incident, or an event that is not based on a comparison with a threshold and can be categorized based on its definitive occurrence. Examples of threshold independent events include, but are not limited to, a loss of power in the injection system 206, a setpoint change, a manual injection of catalyst, a refilling of the storage vessel 210 with catalyst, an unscheduled interruption of the injection process, a recalibration of the injection system 206, a malfunction of the controller 280, a failure of a sensor 224, a deviation from the planned catalyst addition, an injection system alarm, any controller alarm condition, and the like.

If the control module 204 determines that an event has occurred, a message is transmitted to a local or remote device 256, 258 via a communications link at step 904. This communication link can be embodied in a wireless medium, wire medium, optical medium, or combinations thereof. In one embodiment of the invention, an electronic message or file is sent to a central address of the local or remote device 256, 258. A data harvesting application, stored in the local or remote device 256, 258, is programmed to monitor for these messages from the controller 280 on a continual basis. The application will extract and enter the information from the message into a database stored in the device 256, 258, which is used to identify the specific injection system 206 and the type of information transmitted. In the event urgent action is required, the application may include a notification step wherein at least one of the site operator, catalyst supplier, service technician, or other predefined person, is notified of the problem by directly sending an electronic message to the user's email address or other type of address of the local or remote device 256, 258 (i.e., a warning light, pager, cellular phone, PDA and the like). Furthermore, these persons may be located at the controller, on site, in a remote office, or the like.

In another embodiment, the controller could be enabled to monitor for the recurrence of non-reportable, threshold dependent events. On an individual basis, these lesser events would typically transpire without exceeding a threshold level. However, if the controller 280 recognizes the non-reportable events as being repetitive, it could be programmed to identify the event as a chronic problem, i.e., making the string of non-reportable events into a reportable event. One exemplary scenario would be non-critical pressure fluctuations in the injection system 206. Although these pressure fluctuations would not necessarily eclipse a threshold level, they may serve as an indication of a pump or other system malfunction and signify the need for maintenance. Other examples of non-reportable events include, but are not limited to, the manual change in a catalyst setpoint, the manual addition of catalyst, fluctuations of the indicated weight in the vessel, raw weight sensor readings, sensor drift, and the like.

Figure 10:
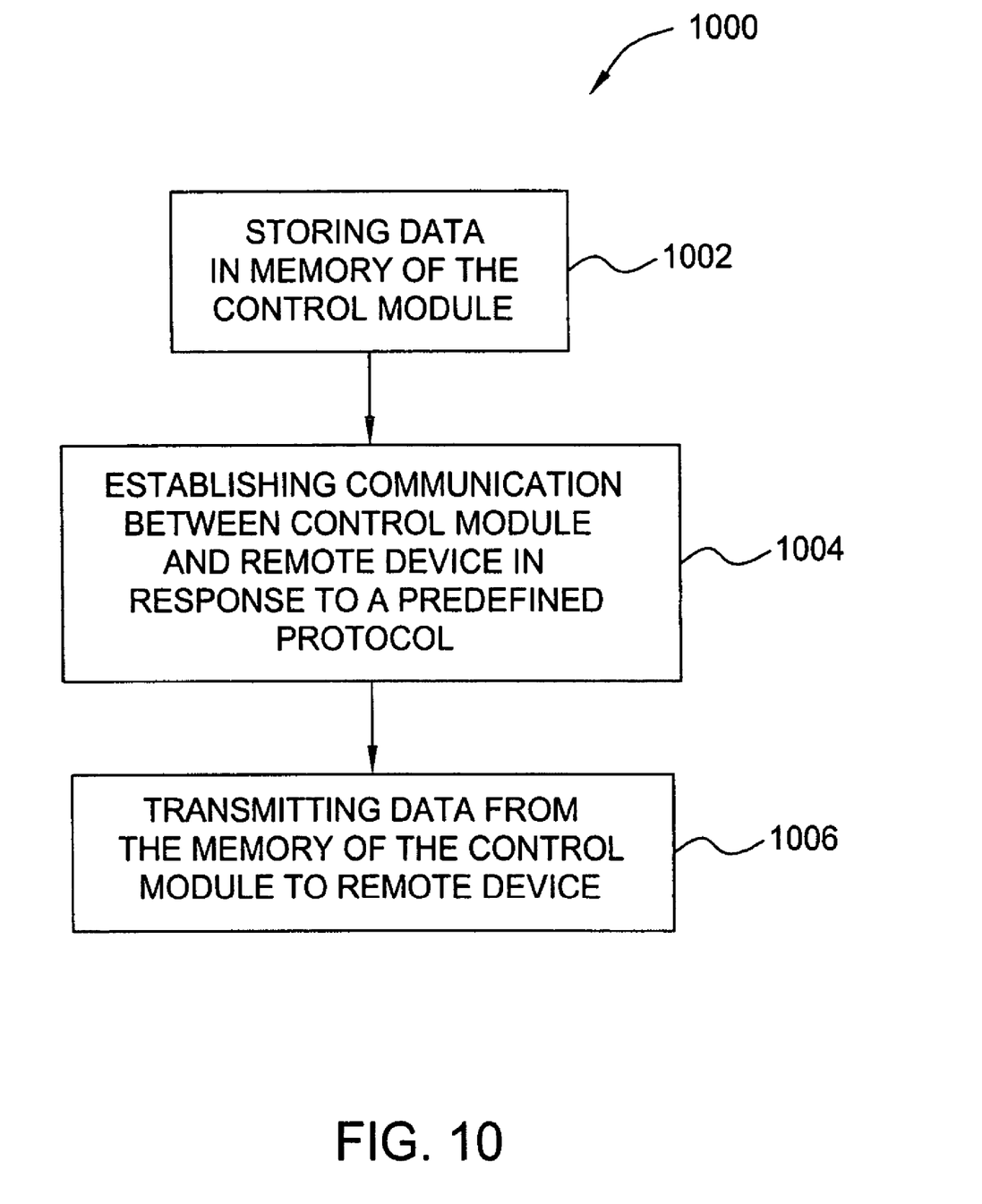
FIG. 10 is a flow diagram of another embodiment of a method for monitoring a catalyst injection system.

Another embodiment of a method 1000 for monitoring an injection system is depicted in FIG. 10. Method 1000 commences at step 1002 where the control module 204 stores the data obtained from the injection system 206 into the memory device 262 of the control module 204. The method 1000 proceeds to step 1004 where communication between the control module 204 and a local or remote device 256, 258 is established in response to a predefined protocol. A predefined protocol is a criteria established to trigger the initiation of communication between the controller 280 and the local or remote device 256, 258. One predefined protocol involves communication initiated by the controller to the remote device. This type of protocol is typically initiated when a predefined even occurs and thus prompts the controller 280 to transmit an electronic message to the local or remote device 256, 258. Other instances when the communication originates at the controller 280 includes, but is not limited to, a random inquiry by an on-site technician, or an automatic transmittal of data on a periodic basis. Alternatively, the predefined protocol may be the initiation of communication by the local or remote device to the controller. This direction of communication is initiated in instances where the user of the remote device arbitrarily queries the controller to obtain data. Similarly, a periodic query can also be sent from the local or remote device 256, 258 to automatically request information in accordance with a predefined schedule. After establishing communication, the method 1000 concludes at step 1006 where the data from the control module 204 is transmitted from the memory device 262 to the local or remote device 256, 258.

The method 1000 can also be used to monitor injection system information. Some examples of injection system information include, but are not limited to, the end of day status of the injection system 206, any injection system diagnostic information being recorded, an event log file, and the like. The injection system information can be provided to the user in a number of ways. Namely, the data can be obtained by transmitting a query to the control module 204 from the local or remote device 256, 258 or alternatively, the control module 204 can be programmed to automatically send the information to a local or remote device 256, 258 on a periodic schedule (as discussed above).

Thus, a method of monitoring a fluid catalytic cracking catalyst injection system has been presented which allows for the remote detection of various types of events and occurrences in the injection system 206. Several embodiments have been presented which enable the status and condition of the injection system 206 to be monitored more efficiently by the processor's on-site operator, the catalyst supplier, service technician, or any other appropriate user. Likewise, the method also allows for the direct and automatic transmittal of system information to a local or remote device 256, 258 on a periodic basis.

Although the teachings of the present invention have been shown and described in detail herein, those skilled in the art can readily devise other varied embodiments that still incorporate the teachings and do not depart from the scope and spirit of the invention.

What is claimed is:

1. A method for monitoring a fluid catalytic cracking catalyst injection system, the method comprising:
    determining an occurrence of a predefined event associated with the fluid catalytic cracking catalyst injection system;
    establishing communication between a control module of the fluid catalytic cracking catalyst injection system and a remote device in response to the event, wherein the remote device is remote from the fluid catalytic cracking catalyst injection system; and wherein the step of establishing communication comprises transmitting information to the remote device in response to a predefined event; and information comprises automatically submitting a reorder request for catalyst if a catalyst inventory level is below a predefined threshold; and
    transmitting information relating to the event between the remote device and control module.

2. The method of claim 1, wherein the step of establishing communication with the control module further comprises:
    initiating communication with the remote device from the control module.

3. The method of claim 1, wherein the predefined event is a threshold dependent event.

4. The method of claim 3, wherein the threshold dependent event is at least one of a blocked or impeded discharge port, a pressure deviation in a storage vessel, a pressure deviation within the injection system, a pressure deviation within a pressure control system, a deviation in the flow of catalyst from the injection system, a deviation from a planned catalyst injection schedule, a temperature deviation within the storage vessel, or a temperature deviation within the injection system.

5. The method of claim 3, wherein the threshold dependent event is at least one of pressure fluctuations in the injection system, a manual change in a catalyst setpoint, fluctuations of the indicated weight in the vessel, raw weight sensor information, sensor drift, or a manual addition of catalyst.

6. The method of claim 1, wherein the predefined event is a threshold independent event.

7. The method of claim 6, wherein the threshold independent event is at least one of a loss of power in the injection system, a setpoint change, a manual injection of catalyst, a refilling of a storage vessel with catalyst, an unscheduled interruption of the injection process, a recalibration of the injection system, a malfunction of the controller, a failure of a sensor, a deviation from a planned catalyst addition, an injection system alarm, or a controller alarm condition.

8. The method of claim 1, wherein the remote device is operated by at least one of a site operator, a catalyst supplier, a site technician, or service technician.

9. A method for monitoring a fluid catalytic cracking catalyst injection system, the method comprising:
    storing data from the fluid catalytic cracking catalyst injection system in a memory device of a control module;
    establishing communication between the control module and at least one of a remote or a local device in response to a predefined protocol; wherein the predefined protocol further comprises an event sensed by at least one of the fluid catalytic cracking injection system or the control module and wherein the predefined protocol comprises an event which exceeds a threshold; and
    transmitting data from the memory device of the control module to the at least one of the remote or the local device.

10. The method of claim 9, wherein the threshold is a predefined number of event occurrences.

11. The method of claim 9, wherein the threshold is a range or a magnitude spectrum.

12. The method of claim 9, wherein the event is at least one of a blocked or impeded discharge port, a pressure deviation in the storage vessel, a pressure deviation within the injection system, a pressure deviation within the pressure control system, a deviation in the flow of catalyst from the injection system, a deviation from a planned catalyst injection schedule, a temperature deviation within the storage vessel, or a temperature deviation within the injection system.

13. The method of claim 9, wherein the event is at least one of a loss of power in the injection system, a setpoint change, a manual injection of catalyst, a refilling of a storage vessel with catalyst, an unscheduled interruption of the injection process, a recalibration of the injection system, a malfunction of the controller, a failure of a sensor, a deviation from a planned catalyst addition, an injection system alarm, or a controller alarm condition.

14. The method of claim 9, wherein the predefined protocol further comprises:
    establishing communication on a predefined schedule.

15. The method of claim 9, wherein the step of establishing communication further comprises:
    communicating with the at least one of the local or the remote device via a communication link; and
    wherein the step of transmitting data further comprises:
    transmitting injection system information.

16. The method of claim 15, wherein the injection system information further comprises at least one of an event log, a periodic status report, or diagnostic information of the injection system.

17. The method of claim 9, wherein the data comprises catalyst inventor information.

* * * * *